United States Patent
Kapanowski et al.

(10) Patent No.: US 9,458,904 B2
(45) Date of Patent: Oct. 4, 2016

(54) DISK BRAKE PAD

(75) Inventors: Martin Christopher Kapanowski, Dexter, MI (US); John Christopher Oakwood, West Bloomfield, MI (US); David Martin Bass, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1778 days.

(21) Appl. No.: 12/651,542

(22) Filed: Jan. 4, 2010

(65) Prior Publication Data

US 2011/0162919 A1 Jul. 7, 2011

(51) Int. Cl.
F16D 69/00 (2006.01)

(52) U.S. Cl.
CPC ......... F16D 69/00 (2013.01); *F16D 2069/004* (2013.01); *Y10T 29/49826* (2015.01)

(58) Field of Classification Search
CPC ........................... F16D 69/00; F16D 2069/004
USPC ............. 188/73.1, 250 R, 250 B, 250 G, 261
See application file for complete search history.

(56) References Cited

U.S. PATENT DOCUMENTS

| | | | |
|---|---|---|---|
| 3,982,611 A * | 9/1976 | Gannon | 188/73.1 |
| 6,524,681 B1 | 2/2003 | Seitz et al. | |
| 7,275,625 B2 * | 10/2007 | Oi et al. | 188/250 B |
| 2005/0023091 A1 | 2/2005 | Ol et al. | |
| 2009/0152058 A1 * | 6/2009 | Thorp | 188/250 G |
| 2009/0266653 A1 * | 10/2009 | Antanaitis et al. | 188/72.1 |

FOREIGN PATENT DOCUMENTS

| | | |
|---|---|---|
| DE | 10 2007 023 191 A1 | 12/2008 |
| EP | 0 616 666 B1 | 12/1995 |
| EP | 0 801 247 A2 | 10/1997 |
| EP | 0 801 247 A3 | 3/1998 |
| FR | 2312690 A * | 1/1977 |
| FR | 2482687 A * | 11/1981 |
| JP | 62274121 A * | 11/1987 |
| WO | WO 93/12358 A1 | 6/1993 |

OTHER PUBLICATIONS

Brake Pad Catalog, Wilwood Engineering, Jun. 12, 2008.*
Translation of JP 62274121 A. Ogihara, Nov. 28, 1987.*

* cited by examiner

*Primary Examiner* — Thomas J Williams
(74) *Attorney, Agent, or Firm* — Jones Robb, PLLC; Raymond L. Coppiellie

(57) ABSTRACT

A brake pad configured for use in a vehicle brake assembly comprises: a friction material having an outermost edge, an innermost edge, and first and second side edges extending therebetween; and a stepped portion extending along the innermost edge of friction material from the first side edge of the friction material to the second side edge of the friction material.

15 Claims, 2 Drawing Sheets

DISK BRAKE PAD

The present teachings relate to a disk brake pad having desirable stopping properties when new, while being broken in, and after being broken in. The present teachings relate more particularly to a disk brake pad having an increased effective radius of the friction material when new to offset a decreased coefficient of friction typical of new brake pads.

BACKGROUND

A significant consideration in brake system design is the new or green effectiveness of a brake pad. As a newly-manufactured brake pad material is "bedded," "burnished," or "broken in," its ability to create friction when forced against a brake rotor generally increases. The increase in friction changes the brake pedal effort required by the driver to reduce vehicle speed. Braking systems should be designed so that stopping requirements as dictated by federal law and customer requirements are satisfied under both new and burnished lining conditions. Braking systems should also be designed to give a driver a consistent brake pedal feel throughout the life of a brake pad.

Existing methods for increasing friction in a green brake lining can include heavy abrasives in the lining formulation, or applying high heat to the braking surface of the lining (commonly called "scorching") during manufacturing to eliminate resins and increase friction. Addition of abrasives can have undesirable long-term side effects as a trade off to achieve desired pedal feel on a new vehicle. Scorching can be undesirable because it is an energy-intensive process involving essentially a controlled burn of the surface of the brake pad lining using jets of flame.

SUMMARY

The present teachings provide a brake pad configured for use in a vehicle brake assembly, comprising: a friction material having an outermost edge, an innermost edge, and first and second side edges extending therebetween; and a stepped portion extending along the innermost edge of friction material from the first side edge of the friction material to the second side edge of the friction material.

The present teachings also provide a method for keeping vehicle brake pedal feel consistent while a brake pad is burnished or bedded in, the brake pad including a friction material having an outermost edge, an innermost edge, and first and second side edges extending therebetween. The method comprises modifying an effective radius of curvature of the friction material from a first effective radius upon initial use of the brake pad to a second effective radius upon completion of a bedding-in period.

The present teachings further provide a method for manufacturing a brake pad for a vehicle brake assembly, the method comprising molding or forming a stepped portion along an innermost edge of a friction material of the brake pad so that the stepped portion extends from a first side edge of the friction material to a second side edge of the friction material.

Additional objects and advantages of the present teachings will be set forth in part in the description which follows, and in part will be obvious from the description, or may be learned by practice of the teachings. Objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated into and constitute a part of this specification, illustrate exemplary embodiments of the present teachings and together with the description, serve to explain the principles of the present teachings.

DESCRIPTION

Reference will now be made in detail to exemplary embodiments of the present teachings, examples of which are illustrated in the accompanying drawings.

The present teachings comprise a brake pad having a friction material with a stepped portion (e.g., a generally squared step or an angled/ramped surface) machined or molded into its radially innermost surface. The stepped portion is located on the rotor side of the pad, along a radially innermost edge of the friction material. In a new condition, the stepped portion acts to increase the effective radius (as measured from the center of rotation of the rotor) of the brake pad, thereby reducing the pedal effort required to reduce vehicle speed when the brake pad friction material has a reduced coefficient of friction. As the brake is used and the pad is burnished, the effective radius of the brake assembly is reduced, balancing the increase in the pad's friction level to keep the brake pedal effort experienced by the driver substantially consistent. As used herein, "stepped portion" refers to a portion of the brake pad friction material that is missing or cut away from an innermost edge of the friction material, causing a temporarily increased effective radius of the friction material and thus the brake pad.

The present teachings allow a brake pad to be developed with desirable green and long-term braking performance, without the above-noted trade-offs. In addition, the manufacturing costs for adding a stepped portion are minimal. The squared or angled step can, for example, be molded or ground into a brake pad, with the exact process of formation being chosen as an extension of the process and tooling already used for the pad manufacturing process.

Figure 1:
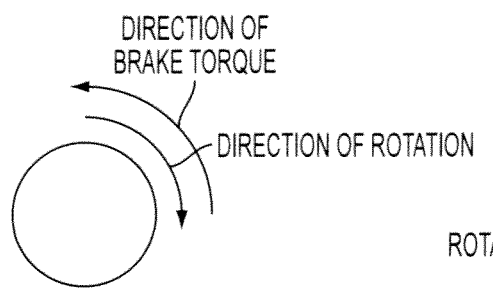
FIG. 1 is a schematic diagram illustrating the direction of vehicle wheel rotation and a resulting direction of brake torque applied by a brake system.

As readily understood by those ordinarily skilled in the art, vehicle deceleration is achieved through the application of a braking torque to a vehicle's rotating wheels. The braking torque is applied in a direction opposite to that of the direction of a wheel's rotation. Most of the required braking torque is generated by the vehicle brake assembly. The direction of vehicle wheel rotation and resulting direction of brake torque applied by the brake assembly are illustrated schematically in FIG. 1.

Figure 2:
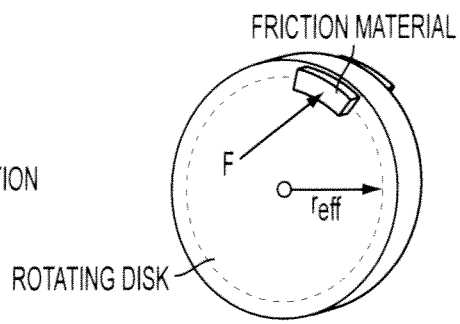
FIG. 2 schematically illustrates an exemplary mechanism for applying torque to a rotating disk.

FIG. 2 schematically illustrates an exemplary mechanism for applying torque to a rotating disk (e.g., a rotor of a brake assembly) via application of a force F to the rotating disk by a friction material (e.g., a brake pad of a brake assembly). As can be seen, the friction material can be pressed against the rotating disk with the applied force F. The resulting torque T applied to the rotating disk in accordance with the embodiment of FIG. 2 can be represented by the following equation:

$$\tau = F\mu r_{\mathit{eff}} N \quad (1)$$

where F is the force applied to the friction material, $\mu$ is the coefficient of friction of the friction material, $r_{\mathit{eff}}$ is the effective radius of the friction material, and N is the number of friction interfaces (e.g., typically two for a brake assembly because a brake pad is utilized on each side of the rotor to apply a balanced force F to the brake rotor). One skilled in the art will understand that a piston (not shown) is typically utilized in brake assemblies to apply the force F to the friction material (i.e., a brake pad). The brake pad and the piston are typically housed in a caliper (not shown) of the brake assembly. The amount of force to be applied by the piston is determined at least in part by the amount of force the driver applies to the vehicle's brake pedal.

In accordance with certain embodiments, the surface area of the friction material is not included in the torque calculation because the surface area of the friction material is mostly relevant to heat transfer and brake pad wear. The greater the surface area of the friction material, the larger the conduit for heat transfer between the brake pad and the brake rotor. A larger heat transfer conduit can help reduce wear by maintaining a lower or more uniform brake pad surface temperature.

In a typical disk brake assembly, as is known to those ordinarily skilled in the art, disk brake pads are respectively positioned at an inside and an outside of the rotor. A piston can be moved, for example by hydraulic pressure creating a force, in a direction to press each of the brake pads against the rotor simultaneously to provide vehicle braking. In certain brake assemblies, the piston applies the force to move the brake pad at the effective radius of the brake pad.

For disk brake assemblies, when calculating torque generated by application of a force by a brake pad to a rotor in a manner illustrated schematically in the embodiment of FIG. 2, the effective radius of the friction material of the brake pad is generally regarded as the distance from the center of the rotor to an average radius of the surface area of the brake pad friction material contacting the rotor. The average radius of the surface area of the brake pad friction material contacting the rotor can be defined as the minimum (inner) radius of pad-to-rotor contact plus the maximum (outer) radius of pad-to-rotor contact, divided by two. As can be seen from equation 1 above, the torque $\tau$ applied to the rotating disk increases as the effective radius $r_{\mathit{eff}}$ of the friction material increases.

In accordance with certain embodiments of the present teachings, the effective radius $r_{\mathit{eff}}$ of a brake pad can be increased by providing a stepped portion on a radially innermost edge of the brake pad friction material. Providing a stepped portion on a radially innermost edge of the brake pad friction material keeps the brake pad's maximum (outer) radius the same while increasing the brake pad's minimum (inner) radius by moving the minimum (inner) radius further from the center of the rotor. Increasing the minimum (inner) radius of the brake pad friction material increases the average radius of the surface area of the brake pad friction material contacting the rotor (which, as stated above, can be defined as the minimum (inner) radius of pad-to-rotor contact plus the maximum (outer) radius of pad-to-rotor contact, divided by two). Because the effective radius $r_{\mathit{eff}}$ of the brake pad is defined as the distance from the center of the rotor to an average radius of the surface area of the brake pad friction material contacting the rotor, increasing the average radius of the brake pad increases the effective radius of the brake pad.

As stated above, the coefficient of friction of a new brake pad is typically less than the coefficient of friction of a brake pad that has been broken in. In accordance with equation 1 above, therefore, less braking torque $\tau$ can be applied by a new brake pad if F, N, and $r_{\mathit{eff}}$ remain constant. Because it is desirable to maintain a constant pedal feel throughout the life cycle of the brake pad, it is desirable to keep the force F required to apply a given torque $\tau$ constant. Varying the number of brake pads N utilized in a braking assembly is not an efficient way to vary the amount of torque applied by the brake assembly for reasons that are readily understood by those ordinarily skilled in the art. The present teachings therefore contemplate varying the effective radius $r_{\mathit{eff}}$ of the brake pads of the brake assembly to offset the variation in the coefficient of friction $\mu$ of the brake pad as it is broken in.

Figure 3:
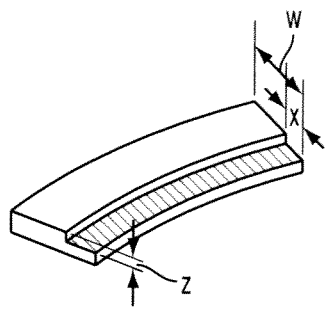
FIG. 3 is a perspective view of a cutaway portion of a friction material of an exemplary embodiment of a stepped disk brake pad in accordance with the present teachings.

FIG. 3 illustrates a cutaway portion of a friction material of an exemplary embodiment of the present teachings including a brake pad having a squared step along a radially innermost edge of the friction material. The illustrated brake pad friction material has an overall width W and the stepped portion has a recessed surface with a width X that is at an initial distance Z from the surface of the remainder of the brake pad friction material contacting the rotor initially and during the burnishing period. The dimensions of the brake pad typically vary by vehicle. The distance Z can be, for example, about 0.020 inches (0.50 mm), which is roughly equal to brake pad wear typically experienced during the burnishing or bedding-in process. In accordance with certain embodiments of the present teachings, the width X of the stepped portion ranges from about one fourth of the width W of the brake pad to about one third of the width W of the brake pad, $$\tfrac{1}{4} \leq X/W \leq \tfrac{1}{3} \quad (2)$$

Figure 4:
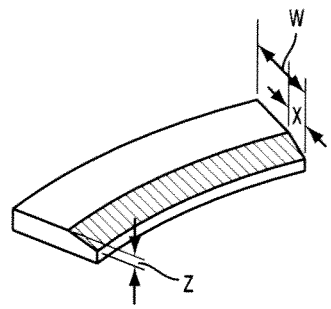
FIG. 4 is a perspective view of a cutaway portion of a friction material of another exemplary embodiment of a stepped disk brake pad in accordance with the present teachings.

FIG. 4 illustrates a cutaway portion of a friction material of another exemplary embodiment of the present teachings, including a brake pad having a ramped or angled step along a radially innermost edge of the friction material. The illustrated brake pad friction material has an overall width W and the stepped portion has a width X and a surface at an initial distance Z from the surface of the remaining portion of the brake pad friction material contacting the rotor initially and during the burnishing period. As stated above, the dimensions of the brake pad typically vary by vehicle. The distance Z can be, for example, about 0.020 inches (0.50 mm), which is roughly equal to brake pad wear typically experienced during the burnishing or bedding-in process. In accordance with certain embodiments of the present teachings, the width X of the stepped portion ranges from about one fourth of the width W of the brake pad to about one third of the width W of the brake pad. The angle of the ramped or angled stepped portion can vary with the width X of the stepped portion, as it spans the width X of the stepped portion and a distance Z of about 0.020 inches (0.50 mm).

It is to be understood that the distance Z of the stepped portion can vary, and is intended to equal approximately the expected amount of wear experienced during the burnishing or bedding-in process of a given brake pad. The distance Z may vary, for example, based on the material chosen for the brake pad, as different brake pad compositions may wear at different rates. In accordance with certain embodiments, the brake pad may comprise, for example, a semi-metallic material, a low-steel material, or a non-asbestos organic (NAO) material.

Figure 5:
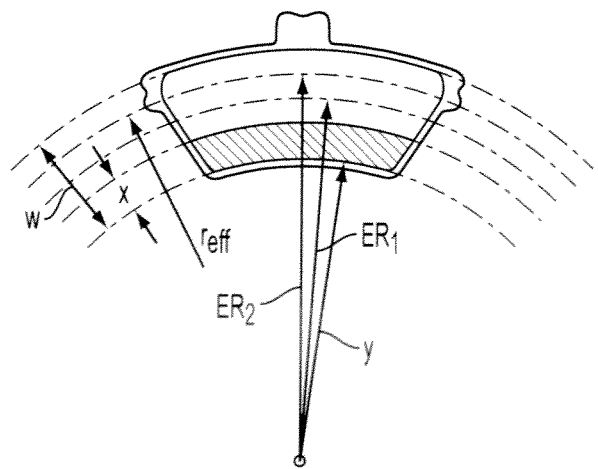
FIG. 5 illustrates a front view of an exemplary embodiment of a stepped disk brake pad in accordance with the present teachings.

FIG. 5 illustrates an embodiment of a disk brake pad including a friction material having side edges, a radially outermost edge, and a radially innermost edge. The stepped portion runs along the radially innermost edge of the friction material.

Referring to FIG. 5, and given that the average radius of the surface area of the brake pad can be defined as the minimum (inner) radius of pad-to-rotor contact plus the maximum (outer) radius of pad-to-rotor contact, divided by two, the effective radius of the brake pad friction material without a stepped portion in FIG. 5 is labeled as $ER_1$ and the effective radius of the brake pad friction material with a stepped portion is labeled as $ER_2$. $ER_1$ and $ER_2$ can be defined as follows:

$$ER_1 = y + W/2 \qquad (3)$$

$$ER_2 = y + X + ((W-X)/2) \qquad (4)$$

It follows that:

$$\Delta ER = ER_2 - ER_1 = X/2 \qquad (5)$$

The value of $\Delta ER$, which can be defined as the effective radius gain achieved by utilizing a stepped portion, can be further defined as follows. When the width X of the stepped portion is one third of the width W of the brake pad (X=W/3) the effective radius change is:

$$\Delta ER = (W/3)/2 = W/6 = 0.167W$$

When the width W of the stepped portion is one fourth of the width of the brake pad (X=W/4) the effective radius change is:

$$\Delta ER = (W/4)/2 = W/8 = 0.125W$$

Thus, the typical effective radius change achieved by provision of a stepped portion at an innermost edge of the brake pad friction material would be about 12.5% to about 16.7% of the width W of the brake pad friction material when a squared or angled stepped portion is incorporated.

Figure 6A:
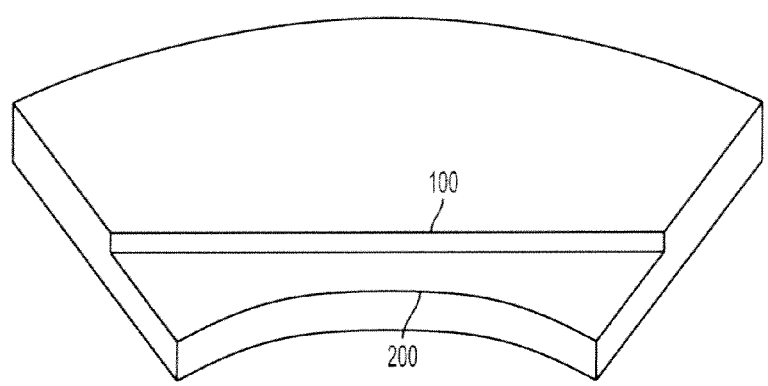
FIG. 6A is a perspective view of an exemplary embodiment of a stepped disk brake pad in accordance with the present teachings.

FIG. 6A is a perspective view of another exemplary embodiment of a stepped disk brake pad friction material in accordance with the present teachings. In the illustrated embodiment, the step is formed in a straight line 100, rather than in an arcuate line running parallel to the lower edge 200 of the brake pad friction material. This straight-line step may be easier to manufacture when certain manufacturing processes such as, for example, grinding are used to form the step on the friction material.

Figure 6B:
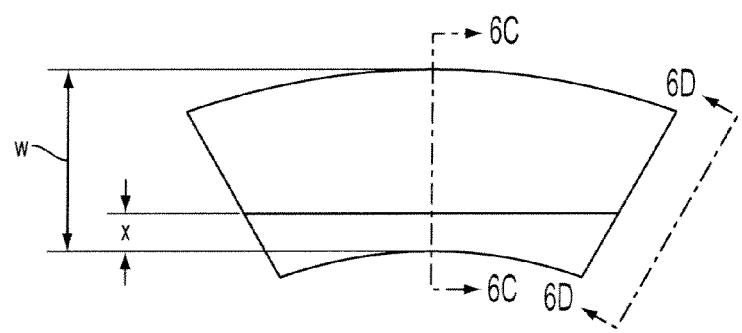
FIG. 6B is a top view of the embodiment of FIG. 6A.

FIG. 6B is a top view of the embodiment of FIG. 6A. In accordance with certain embodiments, the value of the width X of the stepped portion in the center of the friction material can range from about ¼ of the width W of the friction material to about ⅓ of the width W of the friction material. As can be seen, the width X of the stepped portion in this embodiment is greater toward the sides of the friction material than in the center of the friction material.

Figure 6C:
FIG. 6C is a cutaway side view of the embodiment of FIG. 6B, taken along line 6C-6C.
Figure 6D:
FIG. 6D is a side view of the embodiment of FIG. 6B, taken along line 6C-6C.

FIG. 6C is a cutaway side view of the embodiment of FIG. 6B, taken along line 6C-6C, which is at a center of the friction material. Similar to the above embodiments, the distance Z can be, for example, about 0.020 inches (0.50 mm), which is roughly equal to brake pad wear typically experienced during the burnishing or bedding-in process. FIG. 6D is a side view of the embodiment of FIG. 6B, taken along line 6C-6C, showing the step at a side of the friction material.

Other embodiments of the present teachings will be apparent to those skilled in the art from consideration of the specification and practice of the teachings disclosed herein. It is intended that the specification and examples be considered as exemplary only, with a true scope and spirit of the invention being indicated by the following claims.

What is claimed is:

1. A brake pad configured for use in a vehicle brake assembly, the brake pad comprising:
    a friction material having an outermost edge, an innermost edge, and first and second side edges extending therebetween; and
    a stepped portion extending along the innermost edge of the friction material from the first side edge of the friction material to the second side edge of the friction material, the stepped portion having a depth of about 0.02 inches at a time that the brake pad is manufactured,
    wherein the brake pad has an effective radius at the time that the brake pad is manufactured that is about 12.5% to about 16.7% greater than an effective radius of the brake pad after a burnishing or bedding-in process.

2. The brake pad of claim 1, wherein the stepped portion includes a squared step.

3. The brake pad of claim 1, wherein the stepped portion includes a ramped or angled surface.

4. The brake pad of claim 1, wherein the friction material has a width extending from the innermost edge of the friction material to the outermost edge of the friction material, and the stepped portion has a width equal to from about one fourth of the width of the friction material to about one third of the width of the friction material.

5. The brake pad of claim 1, wherein the stepped portion has a depth equal to the expected amount of wear experienced during the burnishing or bedding-in process of the brake pad.

6. A method for keeping vehicle brake pedal feel consistent while a brake pad of the vehicle brake assembly is burnished or bedded in, the brake pad including a friction material having an outermost edge, an innermost edge, and first and second side edges extending therebetween, the method comprising:
    modifying an effective radius of curvature of the friction material from a first effective radius upon initial use of the brake pad to a second effective radius upon completion of a bedding-in period,
    wherein the effective radius before completion of the bedding-in period is about 12.5% to about 16.7% greater than an effective radius of the brake pad after the bedding-in period, and
    wherein the effective radius of curvature is modified by providing a stepped portion extending along the innermost edge of the friction material, the stepped portion having a depth of about 0.02 inches at a time that the brake pad is manufactured.

7. The brake pad of claim 6, wherein the friction material comprises stepped portion having a squared step.

8. The brake pad of claim 6, wherein the friction material comprises a stepped portion having a ramped or angled surface.

9. The brake pad of claim 6, wherein the friction material has a width extending from the innermost edge of the friction material to the outermost edge of the friction material, and the stepped portion has a width equal to from about one fourth of the width of the friction material to about one third of the width of the friction material.

10. The brake pad of claim 6, wherein the stepped portion has a depth equal to the expected amount of wear experienced during the burnishing or bedding-in process of the brake pad.

11. A method for manufacturing a brake pad for a vehicle brake assembly, the method comprising molding or forming a stepped portion having a depth of about 0.02 inches along an innermost edge of a friction material of the brake pad so that the stepped portion extends from a first side edge of the friction material to a second side edge of the friction material, the stepped portion modifying an effective radius of the brake pad such that the effective radius of the brake pad before a bedding-in period is about 12.5% to about 16.7% greater than the effective radius of the brake pad after the bedding-in period.

12. The brake pad of claim 11, further comprising molding or forming a squared stepped portion.

13. The brake pad of claim 11, further comprising molding or forming a stepped portion having a ramped or angled surface.

14. The brake pad of claim 11, wherein the friction material has a width extending from the innermost edge of the friction material to an outermost edge of the friction material, and the stepped portion has a width equal to from about one fourth of the width of the friction material to about one third of the width of the friction material.

15. The brake pad of claim 11, wherein the stepped portion has a depth equal to the expected amount of wear experienced during a burnishing process or the bedding-in process of the brake pad.

\* \* \* \* \*